United States Patent
Krikke et al.

(10) Patent No.: US 10,248,369 B2
(45) Date of Patent: Apr. 2, 2019

(54) METHOD FOR QUEUING PRINT JOBS IN A PRINT FLEET SYSTEM

(71) Applicant: OCE-TECHNOLOGIES B.V., Venlo (NL)

(72) Inventors: Nanne Krikke, Venlo (NL); Josephus A. M. Van Dun, Venlo (NL); Bastiaan J. Hermus, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 65 days.

(21) Appl. No.: 15/353,419

(22) Filed: Nov. 16, 2016

(65) Prior Publication Data
US 2017/0060506 A1 Mar. 2, 2017

Related U.S. Application Data

(63) Continuation of application No. PCT/EP2015/059789, filed on May 5, 2015.

(30) Foreign Application Priority Data
May 16, 2014 (EP) ..................................... 14168598

(51) Int. Cl.
*G06F 3/12* (2006.01)

(52) U.S. Cl.
CPC .......... *G06F 3/1263* (2013.01); *G06F 3/1205* (2013.01); *G06F 3/1255* (2013.01);
(Continued)

(58) Field of Classification Search
CPC .......... G06K 15/002; G06K 19/06037; H04N 1/00477; G06F 3/1237; G06F 3/126;
(Continued)

(56) References Cited

U.S. PATENT DOCUMENTS

| | | | |
|---|---|---|---|
| 9,344,591 B2 * | 5/2016 | Konuma | H04N 1/00408 |
| 2002/0057455 A1 * | 5/2002 | Gotoh | G06F 3/1207 |
| | | | 358/1.15 |

(Continued)

*Primary Examiner* — Nicholas Pachol
(74) *Attorney, Agent, or Firm* — Birch, Stewart, Kolasch & Birch, LLP

(57) ABSTRACT

The invention relates to a method of assigning a print job to a print job queue of a printer, the method comprising the steps of displaying an overview of print job queue representations on a user interface system, each print job queue representation suitable for showing image items representing print jobs in a print job queue dedicated to a printer of a plurality of printers, selecting a first image item of the overview of print job representation, the image item representing a first print job residing in a first print job queue of which a print job queue representation is displayed in the overview, the first print job queue dedicated to a first printer of the plurality, dragging the first image item to a second print job queue representation displayed in the overview, the second print job queue representation representing a second print job queue dedicated to a second printer of the plurality, dropping the first image item on the second print job queue representation displayed in the overview, removing the first print job from the first print job queue, adding the first print job to the second print job queue, and placing the first image item in the second print job queue representation, wherein the method comprises the step of during dragging of the first image item and before dropping of the first image item providing visual feedback of the impact of at least one of the steps according to the method. The invention also relates to a print fleet system configured to apply the method according to the invention.

11 Claims, 8 Drawing Sheets

(52) U.S. Cl.
CPC .......... *G06F 3/1256* (2013.01); *G06F 3/1291* (2013.01); *G06F 3/1296* (2013.01)

(58) Field of Classification Search
CPC .... G06F 3/1296; G06F 3/1263; G06F 3/1268; G06F 9/5083; G03G 15/5083
See application file for complete search history.

(56) References Cited

U.S. PATENT DOCUMENTS

| | | | |
|---|---|---|---|
| 2005/0141007 A1* | 6/2005 | Shirai | G06F 3/0486 358/1.13 |
| 2006/0279781 A1* | 12/2006 | Kaneko | G06F 3/1204 358/1.15 |
| 2009/0217268 A1* | 8/2009 | Pandit | G06F 3/1288 718/100 |
| 2010/0245890 A1* | 9/2010 | Chakraborty | G06F 3/1204 358/1.15 |
| 2011/0013221 A1* | 1/2011 | Kang | G06F 3/1204 358/1.15 |

\* cited by examiner

METHOD FOR QUEUING PRINT JOBS IN A PRINT FLEET SYSTEM

CROSS REFERENCE TO RELATED APPLICATIONS

This application is a Continuation of PCT International Application No. PCT/EP2015/059789, filed on May 5, 2015, which claims priority under 35 U.S.C. 119(a) to patent application Ser. No. 14/168,598.2, filed in Europe on May 16, 2014, all of which are hereby expressly incorporated by reference into the present application.

FIELD OF THE INVENTION

The invention relates to a method of assigning a print job to a print job queue of a printer of a plurality of printers, the method comprising the steps of a) displaying an overview of print job queue representations on a user interface system, each print job queue representation suitable for showing image items representing print jobs in a print job queue dedicated to a printer of the plurality of printers, b) selecting a first image item of the overview, the first image item representing a first print job residing in a first print job queue of which a print job queue representation is displayed in the overview, the first print job queue dedicated to a first printer of the plurality, c) dragging the first image item over the user interface screen, d) detecting an encounter of the first image item with a second print job queue representation displayed in the overview, the second print job queue representation representing a second print job queue dedicated to a second printer of the plurality. The invention also relates to a print fleet system configured to apply the method according to the invention.

BACKGROUND OF THE INVENTION

A print fleet system comprises a plurality of printers. A display of one or more print job queues for one printer on a user interface system is known. For a print fleet system there is a need for an overview of all the print job queues of the plurality of printers in the print fleet system. Print job queues are usually implemented in memory means of a control unit of the printer, for example as linked lists of objects representing print jobs. In such an overview of print job queues a print job queue is usually represented by subsequent rectangles. Each rectangle is representing a print job in the print job queue. The order of the rectangles corresponds to the order of the print jobs in the print job queue. The size of the rectangles correspond to the time needed to finish the corresponding print job. An operator may be able to drag the image item representing a first print job file from one print job queue representation to another print job queue representation in order to move the first print job from a print job queue corresponding to the one print job queue presentation to a print job queue corresponding to the other print job queue representation. However, the printer corresponding to the other print job queue may not be suitable to print the print job.

It is an objective of the invention to provide a method that helps an operator or user to move print jobs from one printer in the print fleet system to another printer in the print fleet system, in a way that is valid and productive.

SUMMARY OF THE INVENTION

For this purpose, the method described here-above comprises the steps of e) determining feedforward of an impact of dropping the first image item on the second print job queue representation, wherein the feedforward is with respect to at least one of the second printer and the first printer, and f) during the encounter of the first image item with the second print job queue representation and before dropping of the first image item on the second print job queue representation displaying on the user interface screen the determined feedforward.

During the drag action—while the print job has not been dropped—visual feedforward is provided what the impact of the drag action will be, for example the duration of the print job on the second printer to which print job queue representation the image item is dropped, a timing aspect for the print jobs which were already residing in the second print job queue, consequences for the usage of media by the second printer, a timing aspect for remaining print jobs in the first print job queue, etc. The operator or user has a clear overview of the whole print fleet and is able to intuitively manage the workload of the printers. The drag and drop mechanism is used to forward print jobs or even parts of print jobs from one printer to another printer and to warn an operator or user when contradictions or media requests appear because of the switching of the first image item print job queues. Feedforward of the impact of the action is provided before the action is actually performed. The visual feedforward of the impact that the drag-and-drop action will have applies on both the first print job queue and the second print job queue, i.e. the queue that the first print job is dragged from and the queue that the first print job is being dragged to, respectively.

According to an embodiment of the method the second printer is a printer out of a printer cluster, the printer cluster comprising a group of printers out of the plurality of printers, and the method comprises the step of, upon an encounter of the first image item with the second print job queue representation, generating a proposal for load balancing the first print job over the group of printers in the printer cluster and displaying the proposal on the user interface screen. Printers may be clustered and displayed in a printer cluster and, when hovering a print job over a printer out of the printer cluster, a proposal for load balancing over the printers in the printer cluster is generated and displayed on the user interface screen. When a print job is dropped on a print job queue representation of a printer of the printer cluster standard load balancing for this printer cluster may be applied, or a request window may appear on the user interface screen. For example, a split and merge action for colour pages and black and white pages may be envisioned. For example, load balancing between two exactly the same printers may be envisioned. The dragging of a print job on a print job queue representation of a printer in a printer cluster may result in a split of the print job into several new print jobs and several new print job display items. For each printer in the printer cluster one new print job and one new corresponding print job representation, like an image item according to the invention, may appear in the corresponding print job queue representation.

Print jobs may be transferred to another printer by dragging and dropping when the first printer reaches a fatal error, a non-fatal error like a lapsed calibration, or an out of media situation.

According to an embodiment the visual feedforward comprises at least one of a contradiction message and a media request. By dragging and dropping a print job from one print job queue to another print job queue, a contradiction may be introduced or a shortage of media may arise.

According to an embodiment the method comprises the steps of g) dropping the first image item on the second print job queue representation displayed in the overview, h) removing the first print job from the first print job queue, i) adding the first print job to the second print job queue, and j) placing the first image item in the second print job queue representation. The dropping action is actually executed. Once the print job is forwarded to the second print job queue of the second printer—dropping is finished—the operator or user receives automatically a warning about contradictions or media requests, if needed, and possible advices to solve the contradictions or media requests. The information of the warning may also be part of the feedforward before the drop action.

According to an embodiment of the method the step of adding the first print job to the second print job queue comprises the sub-steps of k) detecting a position in the second print job queue representation at which the first image item is dropped, l) based on the detected position determining a location in the second print job queue at which location the first print job is intended to be added to the second print job queue with respect to an order of print jobs which are possibly already located in the second print job queue, and m) adding the first print job at the determined location in the second print job queue. By doing so, also the location in the second print job queue can be chosen between two consecutive existing print jobs in the print job queue, before all print jobs in the print job queue, or after all print jobs in the print job queue.

According to a further embodiment the method comprises the step of dropping the first image item on a position inside a second image item of the second print job queue representation, and splitting a print job corresponding the second image item into a first part to be printed before the first job and a second part to be printed after the first job. The first image item is dragged to a position inside the second image item corresponding to a second print job in order to interrupt the second print job at that position. Such a position may snap to a set boundary, a record boundary or a page boundary of the second print job. A dragging action ending inside the second image item results in a split of the second print job into two parts. A first part of the split second print job will be printed before the first print job. A second part of the split second print job will be printed after the first print job.

According to an embodiment of the method in a step n) the first image item is placed in the second print job queue representation in accordance with the location in the second print job queue, at which location the first print job is added. By doing so, the chosen location in the second print job queue is visualized on the user interface screen.

The invention also relates to a print fleet system comprising a plurality of printers, each printer having a control unit for controlling a print job queue of print jobs to be printed by the printer, and a user interface system for displaying an overview of print job queue representations, each print job queue representation suitable for showing image items representing print jobs in a print job queue dedicated to a printer of the plurality of printers, and for receiving user input for maintenance of the print job queues, wherein the user interface system is configured to select a first image item of the overview, the first image item representing a first print job residing in a first print job queue of which a print job queue representation is displayed in the overview, the first print job queue dedicated to a first printer of the plurality, to drag the first image item over the user interface screen, to detect an encounter of the first image item with a second print job queue representation displayed in the overview, the second print job queue representation representing a second print job queue dedicated to a second printer of the plurality, and to display on the user interface screen feedforward of an impact of dropping the first image item on the second print job queue representation during the encounter of the first image item with the second print job queue representation and before dropping of the first image item on the second print job queue representation, and wherein the control units of the first and second printer are configured to determine the feedforward.

According to an embodiment of the print fleet system each control unit is configured to determine contradiction messages and media requests for the feedforward on the user interface system.

According to an embodiment of the print fleet system the user interface system is configured to execute step g) and j) of the method according to the invention, and each control unit is configured to execute steps h) and i) of the method according to the invention.

According to an embodiment of the print fleet system the user interface system is configured to execute the step k) of the method according to the invention and each control unit is configured to execute the steps l) and m) of the method according to the invention.

According to an embodiment of the print fleet system the user interface system is configured to execute the step m) of the method according to the invention.

The invention also relates to a recording medium comprising computer executable program code configured to instruct a computer to perform the method according to the invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The invention will now be explained further with reference to the drawings indicated below.

DETAILED DESCRIPTION OF THE EMBODIMENTS

Figure 1:
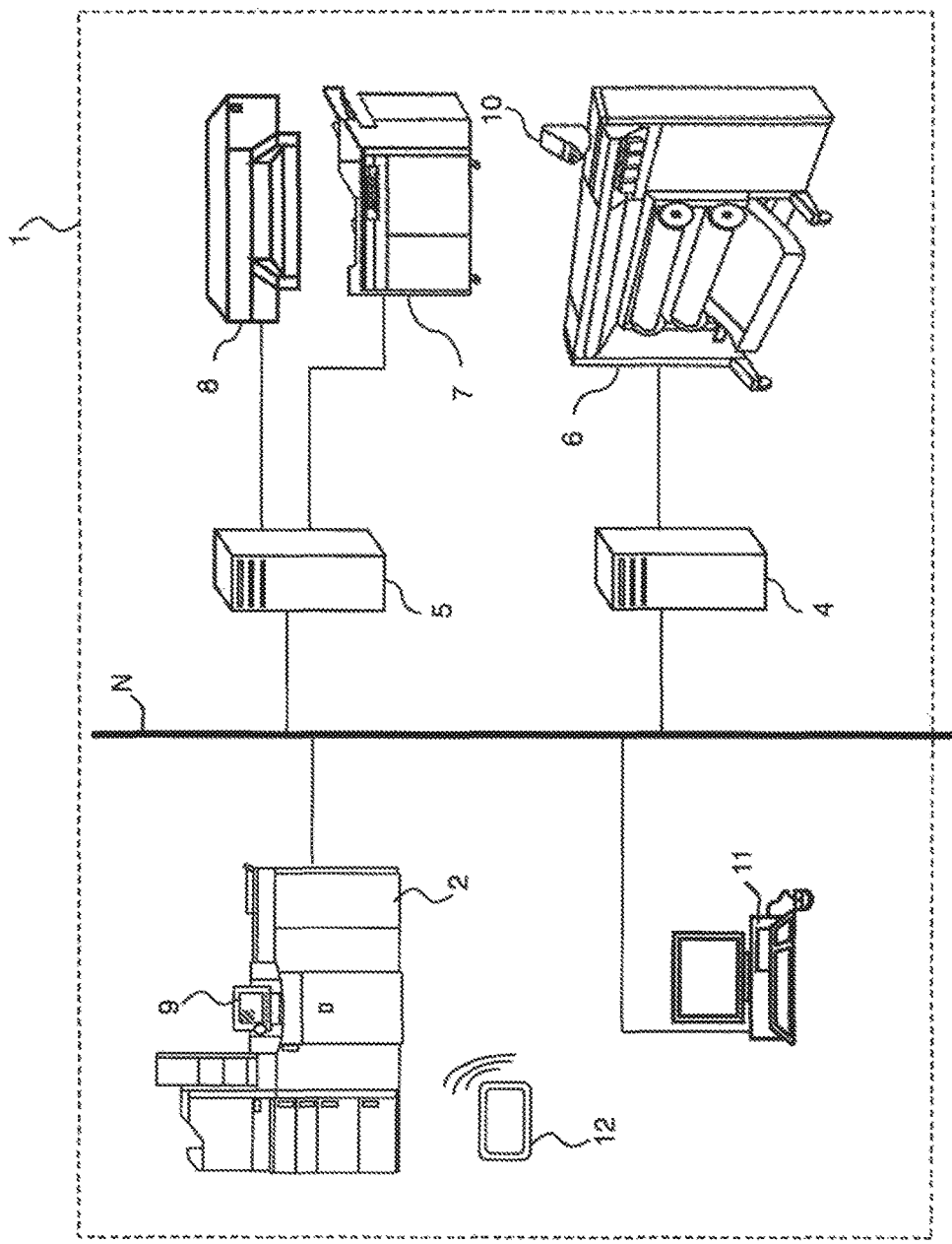
FIG. 1 shows the general arrangement of the print fleet system comprising the plurality of printers according to the invention.

The present invention will now be described with reference to the accompanying drawings, wherein the same or similar elements are identified with the same reference numerals throughout the several views.

FIG. 1 shows a general arrangement of a print fleet system 1 according to the invention. This print fleet system 1 comprises a plurality of printers 2, 6, 7, 8 connected to a network N. The printers 7, 8 are connected to the network N via a server 5. The server 5 may act as a control unit for the printers 7, 8. The printer 6 is connected to the network N via a server 4. The server 4 may act as a control unit for the printer 6. A work station 11 may also be connected to the network N. The work station 11 may act as a control unit for any of the printers 2, 6, 7, 8 of the print fleet system 1. A mobile device 12 may be wireless connected to the network N. The screen of the mobile device 12 may act as a user interface screen of the print fleet system 1. Printer 2 is provided with local user interface screen LUI 9. The printer 6 is provided with a local user interface screen LUI 10. The local user interface screens LUI 9, 10 may act as a user interface screen for the method according to the invention. A control unit of one of the printers 2, 6, 7, 8 may act as a central and data gathering control unit for performing the steps of the method according to the invention. However, a control unit for controlling the method according to the invention separate from the printers 2, 6, 7, 8 but connected to the network N, like the work station 11 may be envisioned. Print jobs submitted to any one of the printers 2, 6, 7, 8 arrive in a corresponding print job queue. The print job queues may be gathered via the network N to a gathering control unit in the print fleet system 1. The data gathering control unit may be one of the control units of the printers 2, 6, 7, 8 or a separate control unit like work station 11.

The data gathering control unit receives the print job queues from each printer in the print fleet system 1. The data gathering control unit is also configured to control display of the print job queues of the print fleet system 1 on a user interface screen like the LUI's 9, 10a, on the screen of the work station 11 or on the screen of the mobile device 12.

Figure 2:
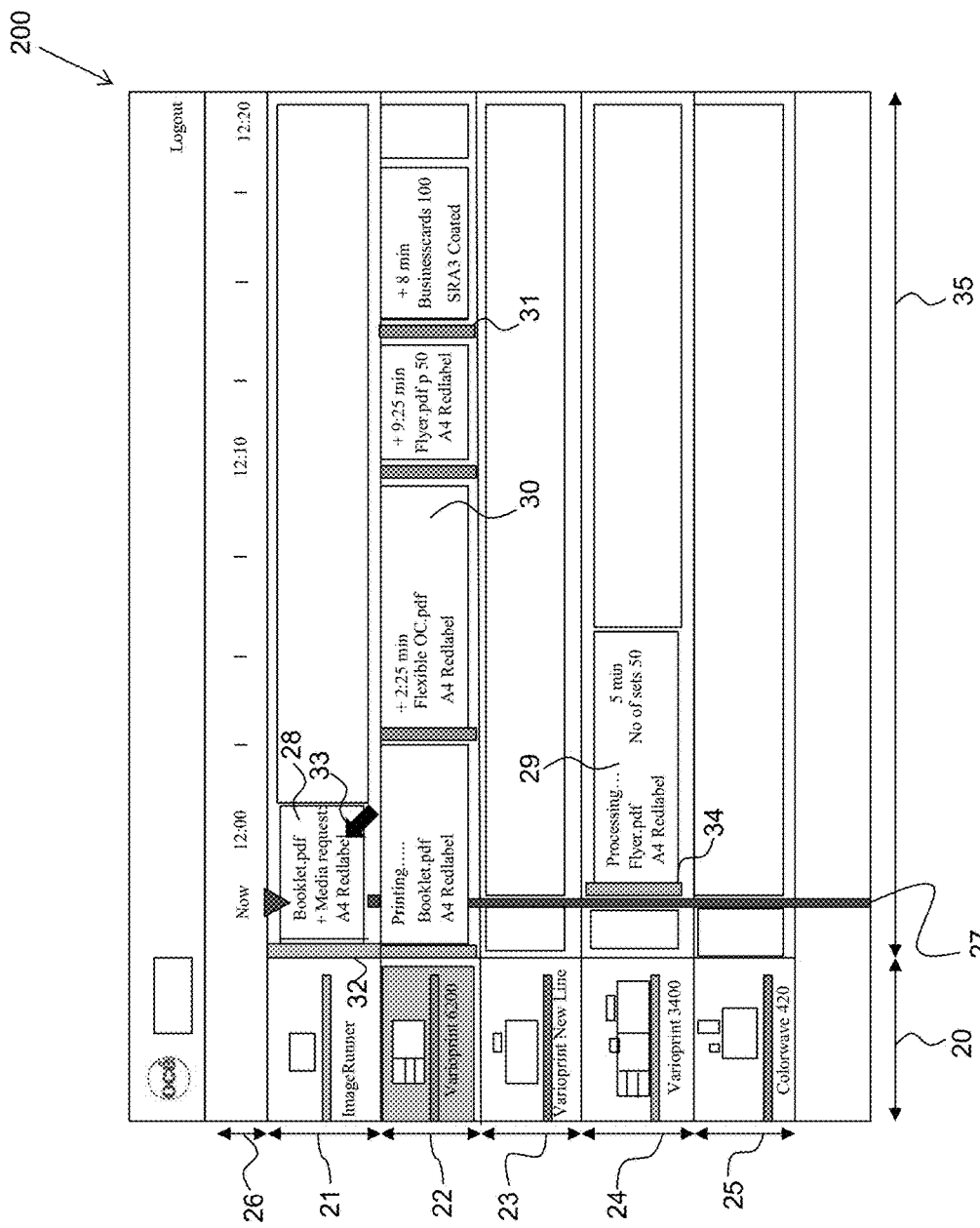
FIGS. 2-5 show windows on a user interface screen according to the method of the invention.

FIG. 2 shows a window 200 on the user interface screen according to the invention. The window 200 shows the printers in the column of area 20 of a print fleet system according to the invention. The print system comprises five printers as shown by printer images on the left side indicated by a double-sided arrow 20. On the right side of each printer a corresponding print job queue representation in row areas indicated by double-sided arrows 21-25 and in a column area as indicated by double-sided arrow 35 is respectively shown for a time frame of approximately 22 minutes comprising 20 minutes from now. The time frame is indicated in an upper part indicated by double-sided arrow 26. A vertical line 27 is extending from the upper part at the moment "now" through all print job queues beneath the upper part into the lower part of the areas indicated by the double-sided arrows 21-25.

Print jobs in the print job queue representations are indicated by white rectangles, for example the white rectangles numbered 28, 29, 30. The white rectangles comprise text items like file name, media type, status information, start time from now, number of pages to be printed, etc. Each rectangle has a coloured left edge 31, 32, 34. The colour of the coloured left edge 31, 32, 34 indicates a status of the print job. The coloured left edge 31 is green coloured indicating that the corresponding print job can be printed at the time indicated by the time frame in the area 26 on the printer corresponding to the print job queue representation in area 22 without any expected media shortage. The coloured left edge 31 is blue coloured indicating that the corresponding print job is printed at this very moment on the printer corresponding to the print job queue representation in area 24 and no media shortage is expected during printing. The coloured left edge 32 is orange coloured indicating that the corresponding print job 28 which is printed at this very moment on the printer corresponding to the print job queue representation in area 21 and a media shortage is expected during printing. This print job 28 is expected not to be completed on this printer corresponding to area 21. Therefore print job 28 is a candidate for forwarding to another printer by means of a dragging action on the rectangle 28 over the window 200 to another print job queue representation. A print job which is planned to be printed on a printer of the print fleet system may have an orange coloured left edge if it is predictable that a shortage of the media type specified for the job will not be present when the print job is going to be printed on the planned printer. The operator may use a mouse to click on the print job 28 in order to select the print job 28 for dragging the rectangle 28 to another print job queue representation in the overview 200. The mouse position is visualized with the large arrow 33. In case of a touch screen the rectangle 28 may be touched in order to select the corresponding print job 28 for dragging.

When dragging is started the print job may be ceased on the printer represented in the area 21. A part of the print job which has not yet been printed on the printer in area 21 may be printed on another printer in the interview to which the rectangle 28 is dragged and dropped. Only the part of the print job that is not yet printed is forwarded to the other printer in the overview. A part may be determined to be a number of sets of a document which sets have not yet been started to be printed, or all pages which have not been started to be printed.

When dragging of a print job is started and the print job has not yet been started to be printed, the whole print job may be printed by another printer in the overview to which the print job is dragged and dropped.

Figure 3:
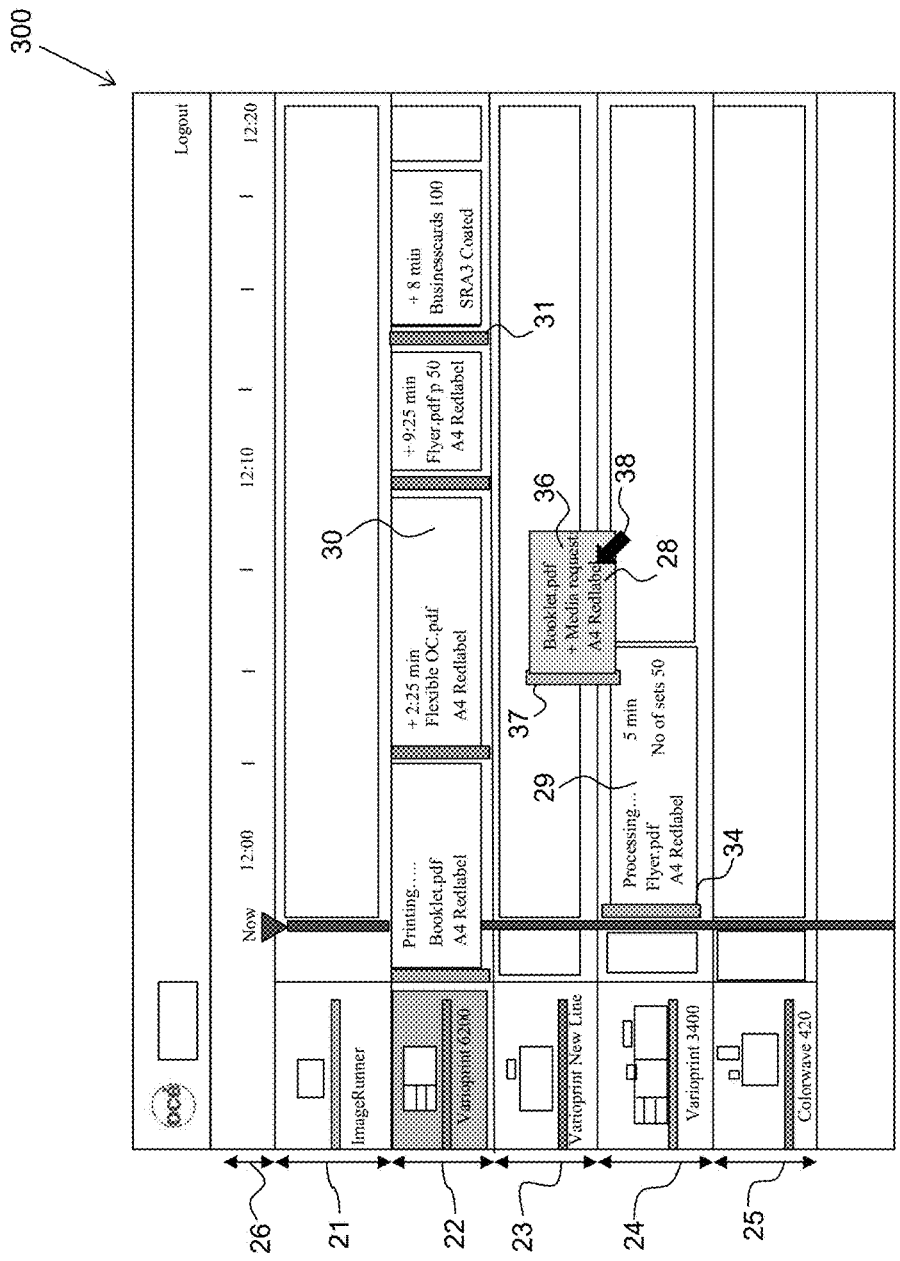

FIG. 3 shows a window 300 on the user interface screen according to the invention. The window 300 shows the same printers as in window 200 in FIG. 2. The rectangle 28 is dragged to the area 23 by the mouse or finger represented by an arrow 38. The area 23 comprises an empty print job queue representation of another printer. When encountering the area 23 or after stopping the dragging of the rectangle 28 at and on the area 23 feedforward of the impact of dropping the rectangle 28 on right part of the area 23 being the print job queue representation of the other printer is determined by the control unit of the other printer. The determined feedforward is displayed on the window 300. In FIG. 3 the feedforward is the message 36 with text "1 Media request" inside the rectangle 28. Other ways of displaying, for example in a separate object like a message box near the rectangle 28 may be envisioned. An orange left edge 37 of the rectangle 28 indicates that there is a media shortage at the other printer with respect to the media specified and needed by the print job. The other printer corresponding to area 23 has a media request, so immediate printing on the other printer is not possible for the remaining pages of this print job.

In a further embodiment the determined feedforward also comprises the adaptation of the length of the rectangle 28 which represents the duration of the print job. If the other printer in area 23 has another print velocity than the printer in the area 21, the duration of the print job when printed on the other printer in area 23 will change.

Figure 4:
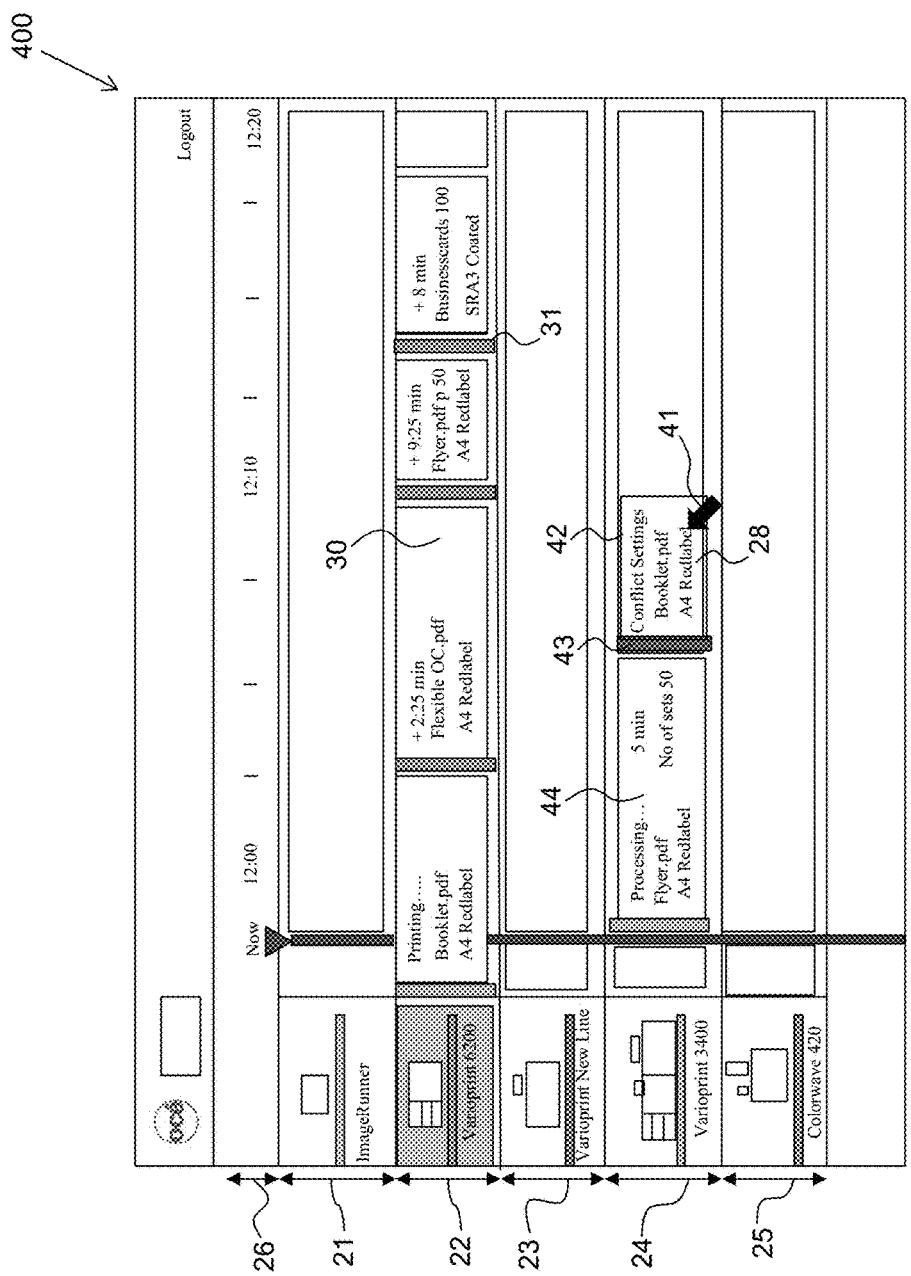

FIG. 4 shows a window 400 on the user interface screen according to the invention. The window 400 shows the same printers as in window 300 in FIG. 3. The rectangle 28 is now dragged to the area 24 by the mouse of finger represented by arrow 41. The area 24 comprises a third printer image and a third print job queue representation of a third print job queue. The third print job queue comprises another print job represented by rectangle 44. When encountering the area 24 or after stopping the dragging of the rectangle 28 at and on the area 24 feedforward of the impact of dropping the rectangle 28 on right part of the area 24 being the print job queue representation of the other printer is determined by the control unit of a third printer corresponding to area 24. The determined feedforward is displayed on the window 400. In FIG. 4 the feedforward is the message 42 with text "Conflicting settings" inside the rectangle 28. Other ways of displaying, for example in a separate object like a message box near the rectangle 28 may be envisioned. The orange left edge 37 of rectangle 28 in FIG. 3 has turned into a red left edge 43. The red left edge 43 of the rectangle 28 indicates that there are conflicting settings between the print job settings and the capabilities of the third printer. The third printer corresponding to area 24 has conflicting settings with the print job settings, so printing on the other printer is not possible at all for the remaining pages of this print job.

A first conflicting setting may arise when the first print job having color images is submitted to the third printer, while the third printer is a black and white printer. A second conflicting setting may arise when the first print job is specified to be printed on a larger media size than the largest format possible on the third printer. A third conflicting setting may arise when the first print job is specified to be finished in a certain way, for example stapled or conform a booklet, while the third printer does not have these finishing capabilities. A fourth conflicting setting may arise when the first print job is specified to be printed on an exact media type from a media library which is not available for the third printer. Suggestions for similar media types may be part of the feedforward. A fifth conflicting setting may arise when the media specified to be printed upon for the first print job is too thick for double-sided printing by the third printer. A sixth conflicting setting may arise when a halftoning profile and/or a color profile specified for the first print job is not available in the third printer. Other conflicting settings than the conflicting settings mentioned here-above may be envisioned.

Figure 5:
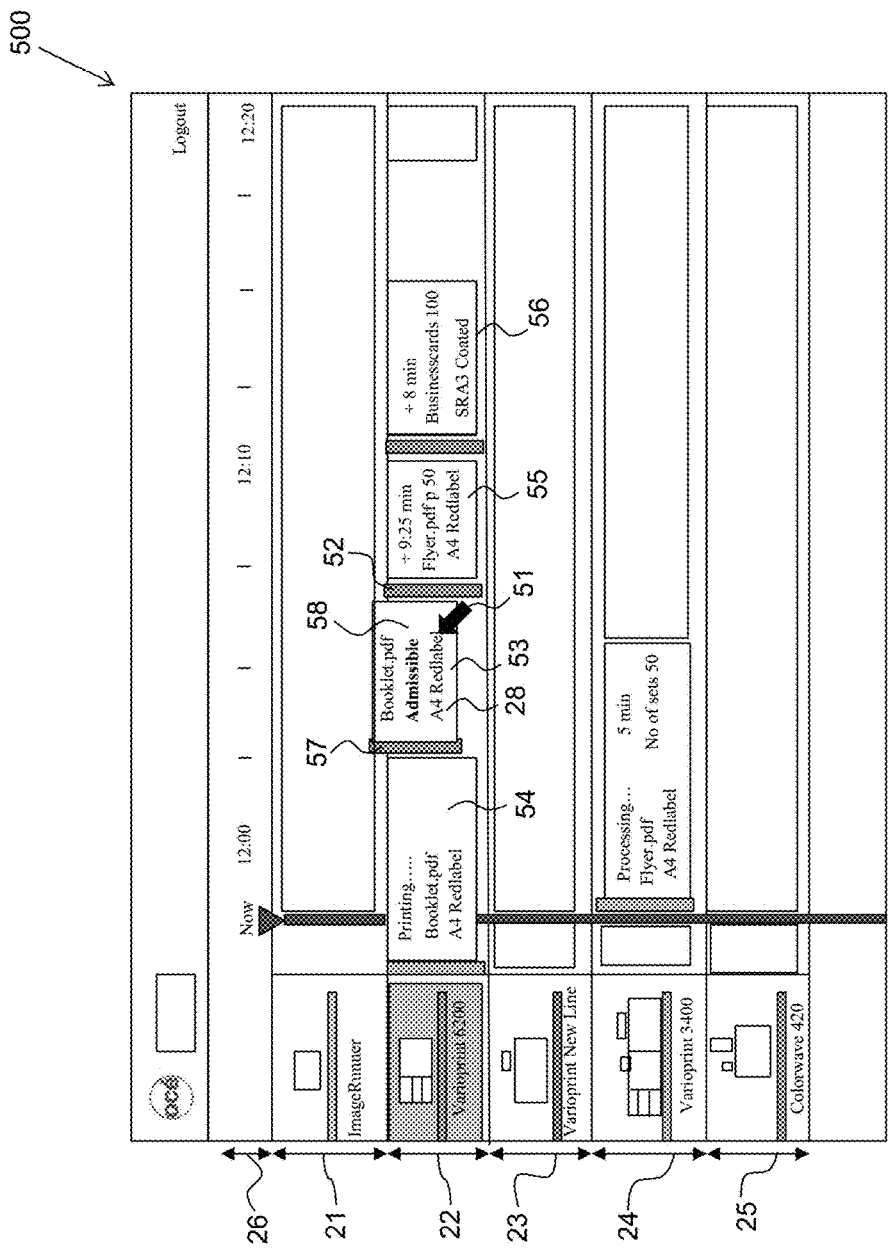

FIG. 5 shows a window 500 on the user interface screen according to the invention. The window 500 shows the same printers as in window 400 in FIG. 4. The rectangle 28 is now dragged to the area 22 by the mouse of finger represented by arrow 51. The area 22 comprises a fourth printer image and a fourth print job queue representation of a fourth print job queue. The fourth print job queue already comprises three print jobs represented by rectangles 54, 55 and 56 respectively. When encountering the area 22 or after stopping the dragging of the rectangle 28 at and on the area 22 feedforward of the impact of dropping the rectangle 28 on right part of the area 22 being the print job queue representation of the other printer is determined by the control unit of a fourth printer corresponding to area 22. The determined feedforward is displayed on the window 400. In FIG. 4 the feedforward is the message 58 with text "Admissible" inside the rectangle 28. Other ways of displaying, for example in a separate object like a message box near the rectangle 28 may be envisioned. The red left edge 43 of rectangle 28 in FIG. 4 has turned into a green left edge 57. The green left edge 57 of the rectangle 28 indicates that the print job is admissible for printing by the fourth printer. A print job represented by the rectangle 54 is currently being printed. When dropping the rectangle 28 on the print job queue representation in area 22, the print job 28 is planned in the corresponding print job queue of the fourth printer.

In a further embodiment a position in the print job queue representation in area 22 is detected at which the rectangle 28 is dropped. Based on the detected position a location is determined in the print job queue of the fourth printer. In FIG. 5 the rectangle 28 is positioned in-between a rectangle 54 and a rectangle 55. Therefore the print job is planned in the print job queue after the print job corresponding to rectangle 54 and before the print job corresponding to rectangle 55. The displayed message 58 is also determined by taking this newly planned location for print job 28 in the print job queue into account.

According to another embodiment a file image representing a document to be printed may be dragged from a file list displayed in a window on the user interface screen to a print job queue representation at a specific position in the print job queue representation. An impact of dropping the file image on the print job queue representation may be shown by a message according to the invention before dropping the file image. Upon dropping the file image a job properties window may pop up and ask the operator or user to make print job settings. The new print job corresponding to the file image may be on hold in the print job queue until the job properties window is closed. The new print job may only start printing when the job properties window is closed. Other print job in the print job queue may hop over the new print job until the operator or user gives a go to start printing.

According to an embodiment a message is not only shown when the dragging of a rectangle representing a print job is stopped at a certain print job queue representation, but at every print job queue presentation which is crossed while dragging the rectangle to the certain print job queue representation. The message shown corresponds to the print job queue representation which is being crossed.

In the FIGS. 2, 3, 4 and 5 a print job in a print job queue representation is represented by a rectangle. Other image items like circles, ellipses, text boxes etc., may be envisioned to represent the print job. In the FIGS. 2, 3, 4 and 5 a print job queue representation is represented in a horizontal row. A vertical orientation of the print job queue representation may be envisioned.

Figure 6:
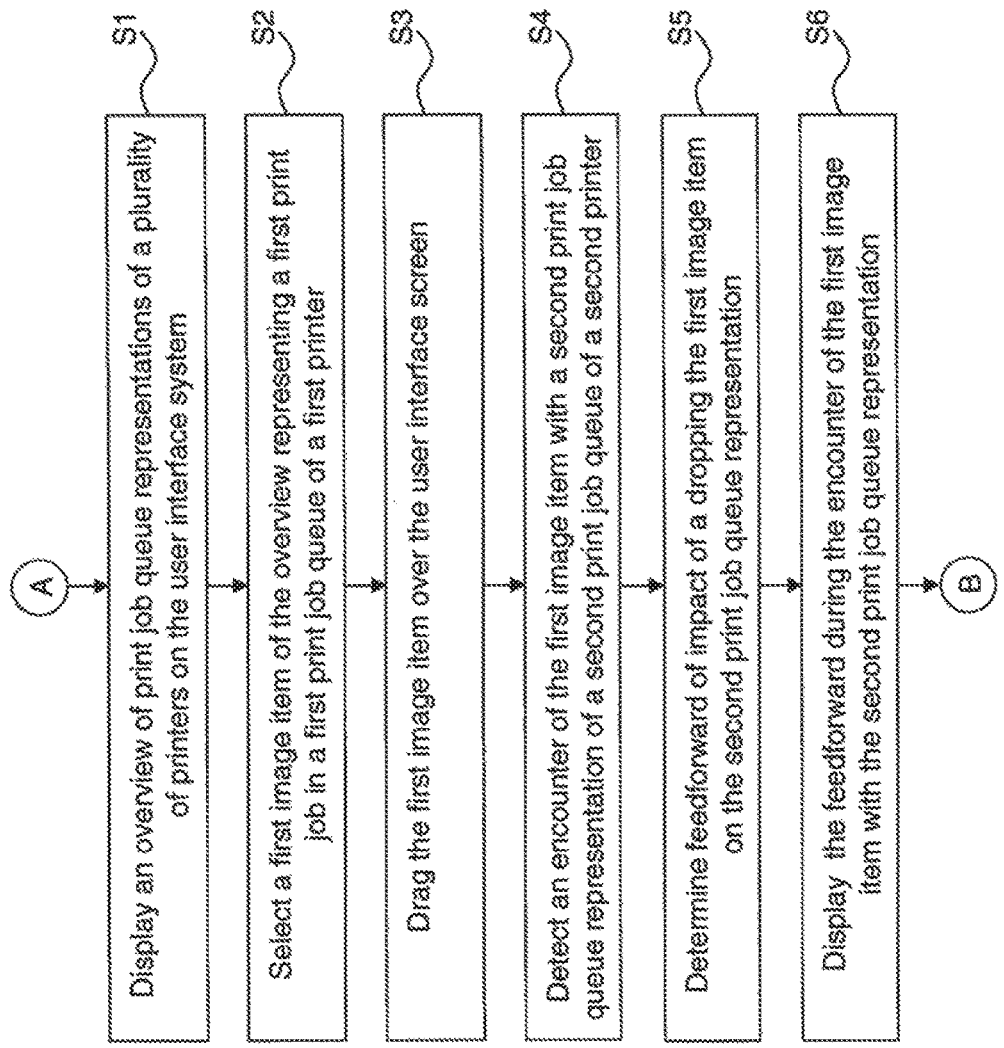
FIGS. 6-8 show flow diagrams of the method according to the invention.
Figure 7:
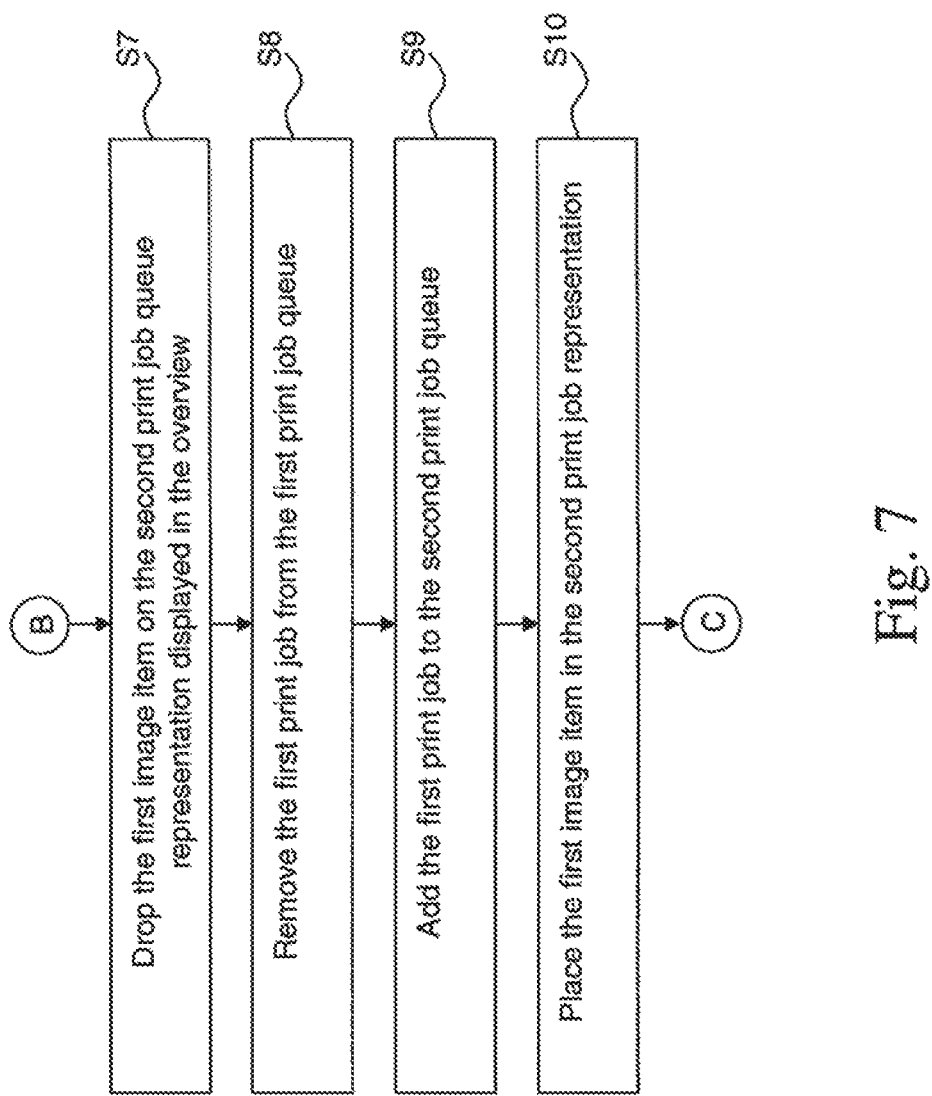
Figure 8:
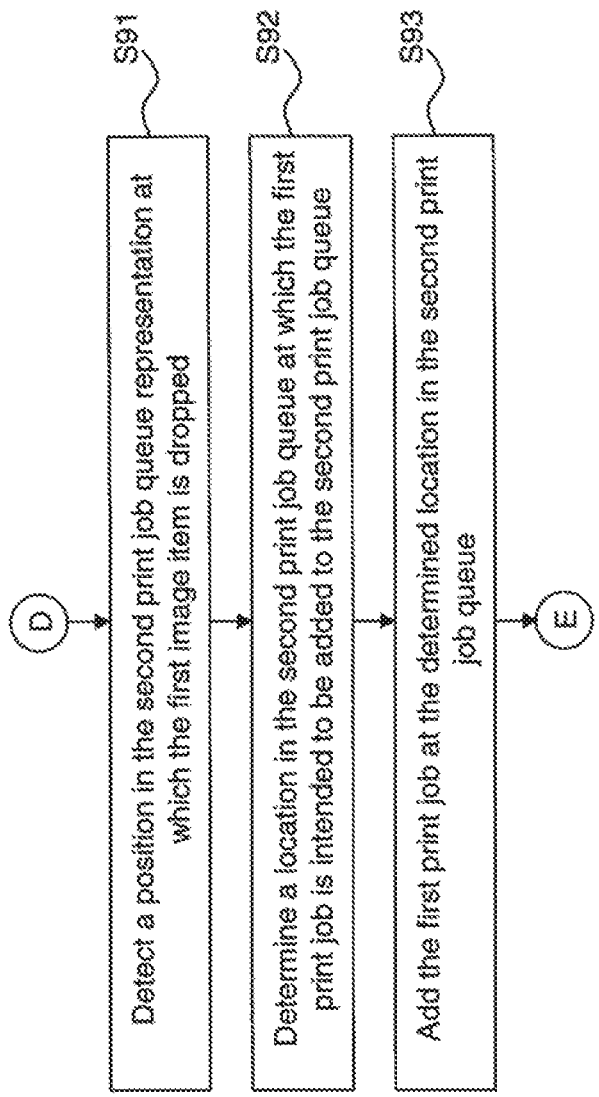

FIGS. 6, 7 and 8 show flow diagrams of the method according to the invention. The method is used for a print fleet system comprising a plurality of printers and a user interface screen.

A first embodiment of the method is explained in FIG. 6. A starting point A in FIG. 6 leads to a first step S1.

In the first step S1 an overview of print job queue representations is displayed on the user interface system. Each print job queue representation shows image items representing print jobs in a print job queue dedicated to a printer of a plurality of printers. The image items may be organized in an order of arrival of the corresponding print jobs in the print job queues. The image items may be rectangles or other visual objects comprising additional print job data like a job name, requested media, duration by means of the size of the rectangle, number of sets, number of records, number of pages, a user name of submitter, output location etc. The data for displaying the print job queue representations is sent from the control units of the printers to the gathering control unit according to the print fleet system of the invention. This data is also refreshed regularly or upon arrival of a new print job at any of the printers of the print fleet system.

In a second step S2 a first image item of the overview of print job representation is selected. The selection may be achieved by means of a mouse or by means of a human finger or stylo in case of a touch screen user interface. The selected image item represents a first print job which resides in a first print job queue. A print job queue representation of this first print job queue is displayed in the overview. The first print job queue is dedicated to a first printer of the plurality.

In a third step S3 the first image item is dragged over the user interface screen. The drag action may be achieved by means of a mouse. The drag action may be achieved by means of a human finger or a stylo in case of a touch screen user interface. Dragging may be achieved by holding the mouse button click while moving the cursor which is positioned at the first image item over the user interface screen or by holding a finger or stylo to the selected first image item and moving the finger or stylo over the user interface screen.

In a fourth step S4 en encounter of the first image item with a second print job queue representation displayed in the overview is detected. The detection may be achieved by calculation of a position of the first image item on the user interface screen and the position of the second print job queue representation on the user interface screen. The second print job queue representation represents a second print job queue dedicated to a second printer of the plurality.

By dragging the first image item to the second print job queue representation the user shows the intention of forwarding the first job to the second printer notwithstanding the fact that the first job was originally submitted to the first printer.

In a fifth step S5 feedforward of an impact of dropping the first image item on the second print job queue representation is determined. Feedforward is information regarding the consequences of a future action which has not yet been decided on. The future action with respect to this invention is the dropping of the first image item on the second print job queue representation. Dropping may be achieved by releasing the pushed in mouse button or in case of a touch screen by lifting up the finger or stylo from the first image item on the user interface screen. The feedforward may comprise a message about media availability, a message about a conflict between print job settings and printer capabilities, the printer status, a new duration of the print job, a changed predicted end time of the print job, a message about the effect of the print job on print jobs scheduled later on for the same printer such as deadlines of the later print jobs, a new media request for later print jobs in the second print job queue, a later print job that is locked, a message about the effect of removing the print job from the first print job queue, for example a reshuffling or translation in time of the print jobs remaining in the first print job queue, or vanishing media request with respect to the later print jobs. Other messages may be envisioned.

In a sixth step S6 the determined feedforward is displayed on the user interface screen, for example near or at the position of the first image item. The determined feedforward is displayed during a time period while the first image item encounters the second print job queue representation. The time period may start when the drag action has been finished and the first image item is not moved anymore. The determined feedforward is displayed before dropping of the first image item on the second print job queue representation, if a dropping action is decided to by the operator or user.

The first embodiment of the method ends in end point B.

FIG. 7 shows a second embodiment of the method according to the invention. The method starts with the steps S1-S6 of FIG. 6 and proceeds to the end point B in FIG. 6 which is simultaneously starting point B in FIG. 7. The starting point B in FIG. 7 leads to a seventh step S7.

In the seventh step S7 the first image item is dropped on the second print job queue representation displayed in the overview. Dropping may be achieved by releasing the pushed in mouse button or in case of a touch screen by lifting up the finger or stylo from the first image item on the user interface screen.

In an eighth step S8 the first print job is removed from the first print job queue.

In a ninth step S9 the first print job is added to the second print job queue.

In a tenth step S10 the first image item is placed in the second print job queue representation.

The second embodiment of the method ends in an end point C.

FIG. 8 shows in detail an embodiment of the ninth step S9. The ninth step S9 start in a starting point D. The starting point D leads to a first sub-step S91.

In the first sub-step S91 a position is detected at which the first image item is dropped on the second print job queue representation. Detection may be established by the interface system by receiving signals in case of a touch screen or by analyzing signals from mouse movement information from a mouse device. The signals are sent to the control unit of the second printer.

In a second sub-step S92 a location is determined at which the first print job is intended to be added in the second print job queue. The location is determined by the control unit of the second printer by means of information from the second print job queue and the by means of the signals received from the user interface screen in the previous sub-step S91.

In a third sub-step S93 the first print job is added at the location determined in the second sub-step S92 in the second print job queue. The control unit of the second printer is adding the first print job to the second print job queue. Instructions are sent from the control unit to the user interface system to place the first image item in the second print job queue representation in accordance with the determined location in the second print job queue, at which determined location the first print job is added.

The skilled person will recognise that other embodiments are possible within the scope of the appended claims.

The invention claimed is:

1. A method of assigning a print job to a print job queue of a printer of a plurality of printers, the method comprising the steps of:

displaying an overview including printer representations of the plurality of printers, and a print job queue representation for each printer representation on a user interface system, each print job queue representation being suitable for showing image items representing print jobs in a print job queue dedicated to the respective printer of the plurality of printers;

selecting a first image item shown in a first print job queue representation for a first printer representation in the overview, the first image item representing a first print job residing in a first print job queue being dedicated to a first printer of the plurality of printers;

dragging the first image item over the user interface screen;

detecting an encounter of the first image item with a second print job queue representation for a second printer representation displayed in the overview, the second print job queue representation representing a second print job queue dedicated to a second printer of the plurality of printers;

determining feedforward of an impact of dropping the first image item on the second print job queue representation, wherein the feedforward is with respect to at least one of the second printer and the first printer;

during the encounter of the first image item with the second print job queue representation, and before dropping of the first image item on the second print job queue representation, displaying on the user interface screen the determined feedforward;

dropping the first image item on the second print job queue representation;

detecting a position in the second print job queue representation at which the first image item is dropped;

based on the detected position, determining a location in the second print job queue where the first print job is intended to be added to the second print job queue, the determined location in the second print job queue directly reflecting a processing start time of the first print job within an order of print jobs which are possibly already located in the second print job queue; and adding the first print job at the determined location in the second print job queue.

2. The method according to claim 1, wherein the feedforward comprises at least one of a contradiction message and a media request.

3. The method according to claim 2, wherein the method further comprises the steps of:

removing the first print job from the first print job queue; and placing the first image item in the second print job queue representation.

4. The method according to claim 3, wherein the method further comprises the steps of:

dropping the first image item on a position inside a second image item of the second print job queue representation; and splitting a print job corresponding to the second image item into a first part to be printed before the first job and a second part to be printed after the first job.

5. The method according to claim 1, further comprising the step of:

placing the first image item in the second print job queue representation in accordance with the location in the second print job queue, at which location the first print job is added.

6. The method according to claim 1, wherein the second printer is a printer out of a printer cluster, the printer cluster comprising a group of printers out of the plurality of printers, and the method comprises the steps of:

upon an encounter of the first image item with the second print job queue representation, generating a proposal for load balancing the first print job over the group of printers in the printer cluster; and displaying the proposal on the user interface screen.

7. A print fleet system comprising:

a plurality of printers, each printer having:

a control unit for controlling a print job queue of print jobs to be printed by the printer; and a user interface system for displaying an overview including printer representations of the plurality of printers, and a print job queue representation for each printer representation, wherein each print job queue representation is suitable for showing image items representing print jobs in a print job queue dedicated to the respective printer of the plurality of printers, and for receiving user input for maintenance of the print job queues, wherein the user interface system is configured to:

select a first image item shown in a first print job queue representation for a first printer representation in the overview, the first image item representing a first print job residing in a first print job queue being dedicated to a first printer of the plurality of printers;

to drag the first image item over the user interface screen;

to detect an encounter of the first image item with a second print job queue representation for a second printer representation displayed in the overview, the second print job queue representation representing a second print job queue dedicated to a second printer of the plurality of printers;

to display on the user interface screen feedforward of an impact of dropping the first image item on the second print job queue representation during the encounter of the first image item with the second print job queue representation and before dropping of the first image item on the second print job queue representation;

to drop the first image item on the second print job queue representation; and to detect a position in the second print job queue representation at which the first image item is dropped, wherein each control unit is configured to, based on the detected position, determine a location in the second print job queue where the first print job is intended to be added to the second print job queue, the determined location in the second print job queue directly reflecting a processing start time of the first print job within an order of print jobs which are possibly already located in the second print job queue, and add the first print job at the determined location in the second print job queue, and wherein the feedforward is with respect to at least one of the second printer and the first printer, and wherein the control units of the first and second printer are configured to determine the feedforward.

8. The print fleet system according to claim 7, wherein each control unit is configured to determine contradiction messages and media requests for the visual feedforward on the user interface system.

9. The print fleet system according to claim 8, wherein the user interface system is configured to place the first image item in the second print job queue representation, and wherein each control unit is configured to remove the first print job from the first print job queue.

10. The print fleet system according to claim 8, wherein the user interface system is configured to place the first image item in the second print job queue representation in accordance with the location in the second print job queue, at which location the first print job is added.

11. A non-transitory computer readable medium comprising computer executable program code configured to instruct a computer to perform the method according to claim 1.

* * * * *